(12) United States Patent
Meidar et al.

(10) Patent No.: US 8,881,352 B2
(45) Date of Patent: Nov. 11, 2014

(54) MACHINING DEVICE FOR MACHINING CRANKSHAFTS AND A MACHINING SYSTEM HAVING SUCH A MACHINING DEVICE

(76) Inventors: Moshe Israel Meidar, New York, NY (US); Wolfgang Horn, Goppingen (DE); Heiner Lang, Pforzheim (DE); Holger H. Kolb, Ludwigsburg (DE); Paul Dieter Scharpf, Schlat (DE)

( * ) Notice: Subject to any disclaimer, the term of this patent is extended or adjusted under 35 U.S.C. 154(b) by 214 days.

(21) Appl. No.: 13/365,392

(22) Filed: Feb. 3, 2012

(65) Prior Publication Data

US 2012/0198671 A1    Aug. 9, 2012

(30) Foreign Application Priority Data

Feb. 7, 2011    (DE) .......................... 10 2011 003 714

(51) Int. Cl.

| | | |
|---|---|---|
| B21K 1/08 | (2006.01) | |
| B23P 23/04 | (2006.01) | |
| B23P 25/00 | (2006.01) | |
| B21K 1/12 | (2006.01) | |
| B23P 17/00 | (2006.01) | |
| B23P 15/28 | (2006.01) | |
| B23B 5/18 | (2006.01) | |
| B23B 3/22 | (2006.01) | |
| B24B 55/02 | (2006.01) | |
| B23Q 11/12 | (2006.01) | |
| B23Q 11/10 | (2006.01) | |
| B23C 3/06 | (2006.01) | |
| B23C 5/28 | (2006.01) | |

(52) U.S. Cl.
CPC .............. B23Q 11/1053 (2013.01); B23C 3/06 (2013.01); B23C 5/28 (2013.01)
USPC ......... 29/6.01; 29/33 R; 29/888.08; 29/888.1; 407/11; 82/50; 82/106; 82/107; 82/108; 82/109; 451/7; 451/53; 451/449; 451/488; 409/135; 409/136; 409/199

(58) Field of Classification Search
USPC ................ 29/6.01, 888.08, 888.1, 33 R, 556; 409/135, 136, 199, 200, 249, 282; 407/11, 12; 82/106–109, 50; 451/7, 49, 451/53, 449, 488
See application file for complete search history.

(56) References Cited

U.S. PATENT DOCUMENTS 4,276,794 A * 7/1981 Berbalk .......................... 82/1.11
4,768,356 A    9/1988 Volker
(Continued)

FOREIGN PATENT DOCUMENTS

DE    19626627 C1    9/1997
DE    10145006 A1    4/2003
(Continued)

OTHER PUBLICATIONS

PCT/EP2012/050884 International Search Report and Written Opinion; Dated Jul. 27, 2012; 10 pages.

*Primary Examiner* — Essama Omgba
*Assistant Examiner* — Darrell C Ford
(74) *Attorney, Agent, or Firm* — Reising Ethington P.C.

(57) ABSTRACT

A machining device for machining crankshafts has a rotationally driven disk-shaped base body with blade inserts arranged peripherally thereon. A first supply line for a cryogenic cooling medium is arranged concentrically with the axis of rotation and is thermally insulated in at least some sections. The tool has a plurality of second supply lines for the cryogenic cooling medium running across the axis of rotation and leading to the blade inserts, the second supply lines each being thermally insulated in at least some sections. A distributor unit connects the first supply line to at least one of the second supply lines for supplying the cryogenic cooling medium to at least one of the blade inserts. The cryogenic cooling medium can be conducted directly to the blade inserts which are engaged with the crankshaft that is to be machined.

18 Claims, 11 Drawing Sheets

(56) References Cited

U.S. PATENT DOCUMENTS

| | | | | |
|---|---|---|---|---|
| 4,790,698 A | * | 12/1988 | Heffron | 409/200 |
| 5,413,081 A | * | 5/1995 | Collingborn | 123/506 |
| 5,639,229 A | * | 6/1997 | Cooke | 417/440 |
| 5,672,035 A | | 9/1997 | Pawlik | |
| 5,806,493 A | * | 9/1998 | Kubo et al. | 123/450 |
| 6,058,910 A | * | 5/2000 | Simmons et al. | 123/450 |
| 6,094,922 A | * | 8/2000 | Ziegler | 62/50.7 |
| 6,319,097 B1 | * | 11/2001 | Coverdale et al. | 451/49 |
| 6,322,300 B1 | | 11/2001 | Santorius et al. | |
| 6,564,682 B1 | | 5/2003 | Zurecki et al. | |
| 7,290,397 B2 | * | 11/2007 | Zurecki et al. | 62/50.7 |
| 7,794,306 B2 | * | 9/2010 | Kondo et al. | 451/49 |
| 8,621,964 B2 | * | 1/2014 | Filho et al. | 82/50 |
| 2003/0215294 A1 | * | 11/2003 | Wermeister et al. | 407/113 |
| 2004/0005844 A1 | * | 1/2004 | Morita et al. | 451/53 |
| 2006/0040584 A1 | * | 2/2006 | Ray et al. | 451/5 |
| 2008/0008550 A1 | * | 1/2008 | Naumann et al. | 409/132 |

FOREIGN PATENT DOCUMENTS

| | | | | |
|---|---|---|---|---|
| DE | 60111162 T2 | 10/2005 | | |
| EP | 0252312 A2 | 6/1987 | | |
| JP | 55112761 A | * | 8/1980 | B24B 27/06 |
| JP | 11246881 A | * | 9/1999 | C10M 103/00 |
| WO | 03035322 A1 | 5/2003 | | |

* cited by examiner

Fig. 13

MACHINING DEVICE FOR MACHINING CRANKSHAFTS AND A MACHINING SYSTEM HAVING SUCH A MACHINING DEVICE

This application claims priority of German application No. 10 2011 003 714.4 filed Jul. 2, 2011.

FIELD OF THE INVENTION

The invention relates to a machining device for machining crankshafts for internal combustion engines.

BACKGROUND OF THE INVENTION

Crankshaft blanks are machined in several steps in the manufacture of crankshafts. The usual machining methods include turn broaching, turn-turn broaching and external milling, for example. The crankshafts are dry machined.

BRIEF SUMMARY OF THE INVENTION

The object of the invention is to create a machining device that will permit a higher productivity and greater profitability in machining crankshafts.

This object is achieved by a machining device in which a cryogenic cooling medium can be guided through the supply lines into the interior of the machining device up to the blade inserts and/or blades which are engaged with the crankshaft while it is being machined in the interior of the machining device. The supply lines are cooled in a highly effective manner due to the low temperature of the cryogenic cooling medium and the fact that the cryogenic cooling medium is supplied directly to the blade inserts, i.e., the blades, so that higher cutting speeds are possible in crankshaft machining. The cryogenic cooling medium also has a positive effect on the service life of the blade inserts. The productivity and profitability can be increased by supplying the cryogenic cooling medium directly to the blade inserts and/or blades.

By means of a distributor unit, the first supply line is connected to at least one of the second supply lines, depending on the rotational position of the tool, with the respective blade insert and/or respective blade inserts being just then engaged with the crankshaft to be machined. This avoids having the cryogenic cooling medium unnecessarily directed past blade inserts which are not at that moment engaged with the crankshaft to be machined and accordingly need not be cooled. This improves profitability. In addition, the supply lines, which are designed with thermal insulation, also prevent the cryogenic cooling medium from undergoing unwanted heating on its path to the blade inserts, and also prevent the components of the machining device, which surround the supply lines, from cooling to an unacceptable extent, so that no thermal stresses can develop in these components. Since the cryogenic cooling medium also evaporates, neither the machine crankshafts nor the machining device or the entire machine tool is soiled.

The supply lines and the distributor unit are designed so that the cryogenic cooling medium at the blade inserts has a temperature of less than −60° C., in particular less than −120° C., in particular less than −150° C., and in particular less than −180° C. Liquid or gaseous nitrogen, liquid or gaseous oxygen, gaseous hydrogen, gaseous helium, liquid or gaseous argon, gaseous carbon dioxide and liquid or gaseous natural gas, for example, may be used as the cryogenic cooling medium. Nitrogen is preferably carried through the supply lines to the blade inserts. The first supply line and/or the second supply lines and/or the distributor unit in particular have a specific thermal conductivity at 0° C. of at most 0.40 W/(mK), in particular at most 0.30 W/(mK), and in particular at most 0.20 W/(mK).

The machining device ensures a good thermal insulation of the first supply line to prevent unwanted heating of the cryogenic cooling medium. The first supply line is preferably designed to be completely insulated thermally, i.e., over its entire length. The supply line has an internal tube and an external tube surrounding the former, the two tubes being connected to one another at the ends. The insulated space bordered by the tubes is evacuated so that the supply line has an extremely low specific thermal conductivity.

The machining device permits equalization of the different changes in length of the internal tube and the external tube. If the first supply line has cryogenic cooling medium flowing through it, then the internal tube essentially assumes the temperature of the medium, whereas the external tube cools much less due to the insulation medium arranged between the two tubes. The internal tube undergoes a much greater change in length than the external tube as a result. To prevent damage to the first supply line, at least one of the tubes is designed with a variable length. The external tube preferably has meandering metal bellows for thermal length equalization.

The machining device allows positioning of the first supply line in the direction of the axis of rotation in a simple manner for changing the tool or for targeted distribution of the cryogenic cooling medium to the second supply lines. For changing the tool, the first supply line is shifted linearly and thereby uncoupled from the distributor unit and the second supply line(s). Then the tool is changed in the usual manner. After the tool change, the first supply line is again displaced linearly in the opposite direction and is thus coupled back to the distributor unit and the second supply lines. The shifting unit is preferably designed as a pneumatically or hydraulically operable, double-acting piston-cylinder unit. The piston of this piston-cylinder unit is connected to the first supply line, for example. In addition, the first supply line may be displaced linearly to control the distribution of the cryogenic cooling medium to the second supply lines in a targeted manner and thus adjust the angle of emergence of the cryogenic cooling medium. To do so, the first supply line is displaced linearly by means of the shifting unit in the distributor unit in a controlled manner, such that, depending on the axial displacement position of the first supply line, the distribution of the cryogenic cooling medium to the second supply lines is altered. In this way, a large angle of emergence of the cryogenic cooling medium can be achieved for the machining of the crankshaft walls, whereas a smaller angle of emergence can be achieved for the machining of the cylindrical bearing surfaces. Targeted positioning of the first supply line may be accomplished, for example, using the piston-cylinder unit described here, in which the piston can not only approach the end positions, however, but may also approach any intermediate positions. To this end, the piston-cylinder unit may be equipped with a distance measuring system, which determines the position of the piston. To adjust the position, the desired partial working space is filled with the pressure medium via a respective valve and/or servo valve until reaching the desired position as a function of the current position. Alternatively, an electric drive may also be used as the shifting unit. To change the location of the angle of emergence of the cryogenic cooling medium, the first supply line may additionally be pivotable about the axis of rotation.

The machining device permits a targeted supply of the cryogenic medium to the blade inserts which are engaged with the crankshaft to be machined when the engagement site of the tool travels during machining. This is the case, for example, in external milling of pin bearings and/or crankshaft walls. The drive unit is embodied as an NC axis, for example. An extremely accurate correspondence of the position and/or movements of the outlet point of the cryogenic cooling medium with the blade inserts and the engagement point of the tool in machining of the crankshaft can be achieved through an electronic gearbox function with the rotational movement of the crankshaft, which is implemented by a control unit. By pivoting the first supply line, it is thus possible to alter the position of the angle of emergence of the cryogenic cooling medium. It is possible to increase the cutting speed because the cryogenic cooling medium is supplied to exactly the location where the machining is taking place.

The machining device ensures a simple design of the distributor unit and a simple distribution of the cryogenic cooling medium from the first supply line to the second supply lines accordingly.

The machining device ensures a simple and compact design of the distributor unit and a simple distribution of the cryogenic cooling medium from the first supply line to the second supply lines accordingly. Due to the outlet opening of the first supply line being arranged on the periphery, this is coupled only to the second supply lines, whose respective second boreholes are arranged in the area of the outlet opening, depending on the rotational position of the tool. The outlet opening is preferably designed as an elongated hole, so that second boreholes arranged with an axial offset from one another may come to lie simultaneously in the area of the outlet opening, and therefore multiple second supply lines can be supplied with the cryogenic cooling medium at the same time.

The machining device allows a change in the angle of emergence of the cryogenic cooling medium in a simple manner. Due to the fact that the width of the outlet opening changes over its length, the angle of emergence of the cryogenic cooling medium can be altered through axial displacement of the first supply line in the distributor unit. If the cryogenic cooling medium enters an area of the outlet opening having a large width, then the cryogenic cooling medium is distributed to several second supply lines, thereby achieving a large angle of emergence. This displacement position of the first supply line is suitable for machining of crankshaft walls. However, if the cryogenic cooling medium emerges in an area of the outlet opening having a smaller width, then fewer second supply lines and/or in the extreme case, only one second supply line will be controlled, so that the cryogenic cooling medium emerges at a much smaller angle of emergence. This position of the first supply line is suitable for machining of the cylindrical bearing surfaces. The axial displacement position of the first supply line is preferably coupled to the rotation of the crankshaft via a control unit, so that the respective suitable angle of emergence for the cryogenic cooling medium is automatically set for both the machining of the crankshaft walls and for the machining of the cylindrical bearing surfaces. The width of the outlet opening may change in stages, for example, or continuously. In a stepwise change, discrete angles of emergence are set, whereas in a continuous change the angle of emergence also changes continuously or is adjustable in finer increments.

The machining device permits a simple insertion of the first supply line into the first borehole after a tool change.

The machining device ensures a loss-free feed of cryogenic cooling medium to the blade inserts. The seals here in particular have a high resistance to the cryogenic cooling medium. The seals are preferably made of a plastic material and/or a rubber material, which has a high chemical resistance and good thermal insulation properties. The seals are preferably made of PTFE (polytetrafluoroethylene).

The machining device ensures a compact and robust design of the distributor unit and/or of the tool. Since the distributor unit consists of a thermally insulating material which can be subjected to much less mechanical stress than metal, the metallic retention knobs ensure that mechanical stresses will not lead to breakage of the distributor unit.

The machining device prevents unwanted heating of the cryogenic cooling medium on the way to the blade inserts. The plastic material preferably has a specific thermal conductivity at 0° C. of at most 0.40 W/(mK), in particular at most 0.30 W/(mK), and in particular at most 0.20 W/(mK). The distributor unit is preferably made of PTFE.

The machining device ensures good thermal insulation of the second supply lines to prevent an unwanted heating of the cryogenic cooling medium. The second supply lines are preferably designed to be completely thermally insulating, i.e., over the entire length. The second supply lines each have an internal tube and an external tube surrounding the former, joined together at the ends. The insulation space bordered by the tubes is evacuated so that the second supply lines have an extremely low specific thermal conductivity.

The machining device permits an equalization of the different changes in length of the internal tube and the external tube. If the second supply lines have cryogenic cooling medium flowing through them, the internal tube assumes essentially its temperature whereas the external tube cools to a much lesser extent because of the insulating medium provided between the two tubes. The internal tube changes its length much more than the external tube as a result. To prevent damage to the second supply lines, at least one of the tubes is of a variable length. The external tube preferably has meandering metal bellows for thermal length equalization.

The machining device ensures a targeted distribution of the cryogenic cooling medium to a plurality of blade inserts, which are engaged with the crankshaft to be machined.

The present invention is also based on the object of creating a machining system having a greater productivity and profitability in machine crankshafts.

This object is achieved by a machining system having the features already described above. The cryogenic cooling medium is supplied from the thermally insulated storage device through the thermally insulated supply line to the machining device. To keep the temperature of the stored cryogenic cooling medium constant, a cooling unit is provided. In addition, the machining system has a delivery pump for delivering the cryogenic cooling medium from the storage device to the machining device. For the tool change, the machining system additionally has a valve, i.e., a cut-off valve which interrupts the supply of the cryogenic cooling medium to the machining device before a tool change. The cooling unit and/or the delivery pump and/or the valve is/are controllable by means of a control unit. The machining system is part of an otherwise conventional machine tool for machining crankshafts.

The machining system permits an adjustment of the cooling effect by adjusting the flow rate. To do so, the valve may be designed as a servo valve, for example. The width of the outlet opening of the first supply line and thus the angle of emergence are dimensioned according to the largest cutting arc length. In machining smaller cutting arc lengths, the flow rate of cryogenic coolant medium through the valve is reduced accordingly. The cooling effect may thus be adjusted easily and inexpensively.

BRIEF DESCRIPTION OF THE SEVERAL VIEWS OF THE DRAWINGS

Additional features, advantages and details of the invention are derived from the following description of multiple exemplary embodiments, in which.

DETAILED DESCRIPTION OF THE INVENTION

A first exemplary embodiment of the invention is described below with reference to FIGS. 1 through 8. A machine tool (not shown in detail) has a machining system 1 for machining crankshafts 2, comprising a machining device 3, a thermally insulated storage device 4 for supplying a cryogenic cooling medium 5, a cooling unit 6 for cooling the cryogenic medium 5, a delivery pump 7, a supply line 8 with a respective cut-off valve and/or servo valve 9, and a control device 10. The supply line 8 is connected to the storage device 4 and the machining device 3 and is thermally insulated. The machine device 3, the cooling unit 6, the delivery pump 7 and the cut-off valve 9 can be controlled by means of the control device 10. The design of the machine tool beyond the machining system 1 is conventional and is already known.

Figure 1:
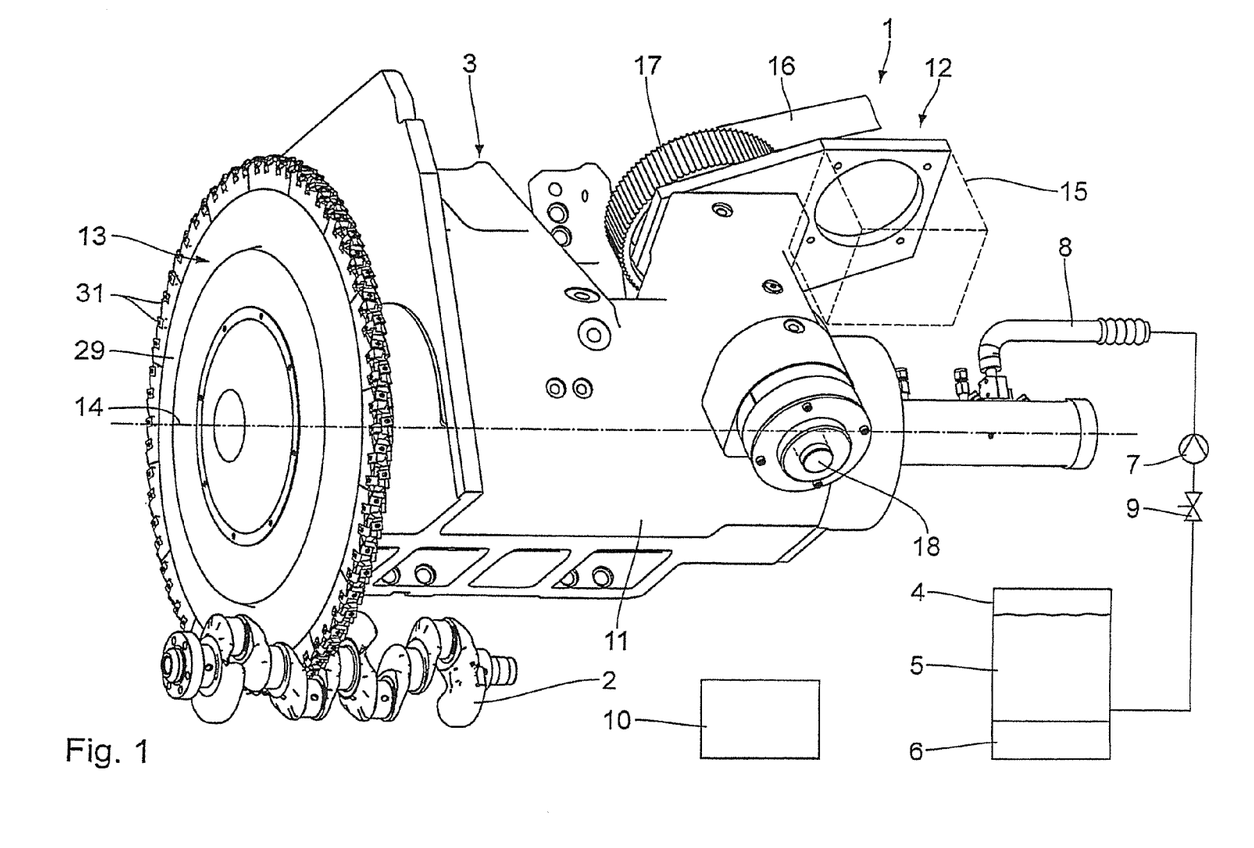
FIG. 1 shows a schematic diagram of a machining system for machining crankshafts according to a first exemplary embodiment.
Figure 2:
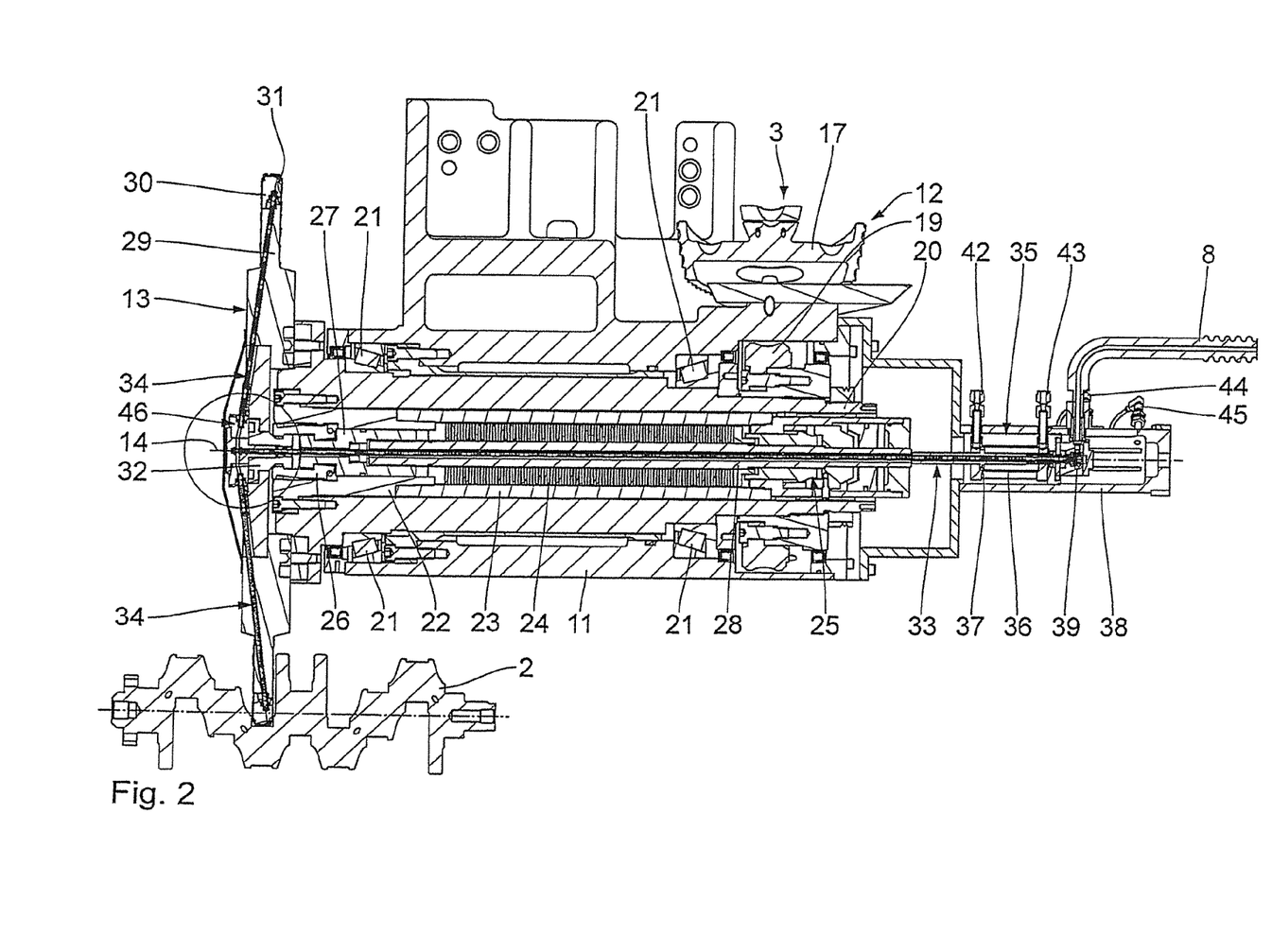
FIG. 2 shows an axial section through a machining device of the machining system of FIG. 1 in an operating position for supplying a cryogenic cooling medium.

The machining device 3 has a housing 11 on which is arranged a first drive unit 12 for rotationally driving a tool 13 to rotate about an axis of rotation 14. The drive unit 12 comprises an electric drive motor 15, which is attached to the housing 11 on the outside, and via a toothed belt 16 it rotationally drives a gearwheel 17 with a worm shaft 18 arranged on it.

Referring to FIG. 2, the worm shaft 18 is coupled to a worm wheel 19, which is arranged concentrically with the axis of rotation 14 and is attached to a rotating sleeve 20. The rotating sleeve 20 is supported by bearings 21 on the housing 11, so that it can rotate about the axis of rotation 14. Two sleeve parts 22, 23, a plurality of spring elements 24 and a first piston-cylinder unit 25 are arranged in the rotary sleeve 20. The spring elements 24 are designed as plate springs. The first sleeve part 22 is attached to one end of the rotating sleeve 20 which faces the tool 13. The second sleeve part 23 is in contact with the first sleeve part 22 and extends in the interior of the rotating sleeve 20 up to approximately the opposite end. The piston-cylinder unit 25 is again in contact with the second sleeve part 23 and is attached to the rotating sleeve 20. The spring elements 24 are arranged in the interior of the second sleeve part 23 and are in contact with the sleeve part 22 on the one end and with the piston-cylinder unit 25 on the other end. The piston-cylinder unit 25 is hydraulically operable in the usual way by means of a delivery pump (not shown in detail).

A collet chuck 26 for clamping the tool 13 is arranged in the interior of the first sleeve part 22. The collet chuck 26 is operable by means of operating sleeve 27 which is mounted in the first sleeve part 22 so that it is axially displaceable. The operating sleeve 27 is attached to an operating rod 28 which extends concentrically with the axis of rotation 14 through the spring elements 24 up to the piston-cylinder unit 25, to which it is also attached. The collet chuck 26 is put under tension in the usual way by means of the spring elements 24 and is releasable against the prestressing force of the spring elements 24 by operation of the piston-cylinder unit 25 and by axial displacement of the operating rod 28.

The tool 13 serves to machine the pin bearing and center bearing of the crankshaft 2. The tool 13 has a disk-shaped base body 29, to which cassettes 30 with blade inserts 31 arranged therein are circumferentially attached at the same angular distances. For clamping the tool 13, a retention knob 32 is arranged on the base body 29 concentrically with the axis of rotation 14. The retention knob 32 is made of a metallic material and is shaped at the end, so that it can be clamped by means of the collet chuck 26, and the tool 13 can thus be secured on the rotating sleeve 20.

Figure 3:
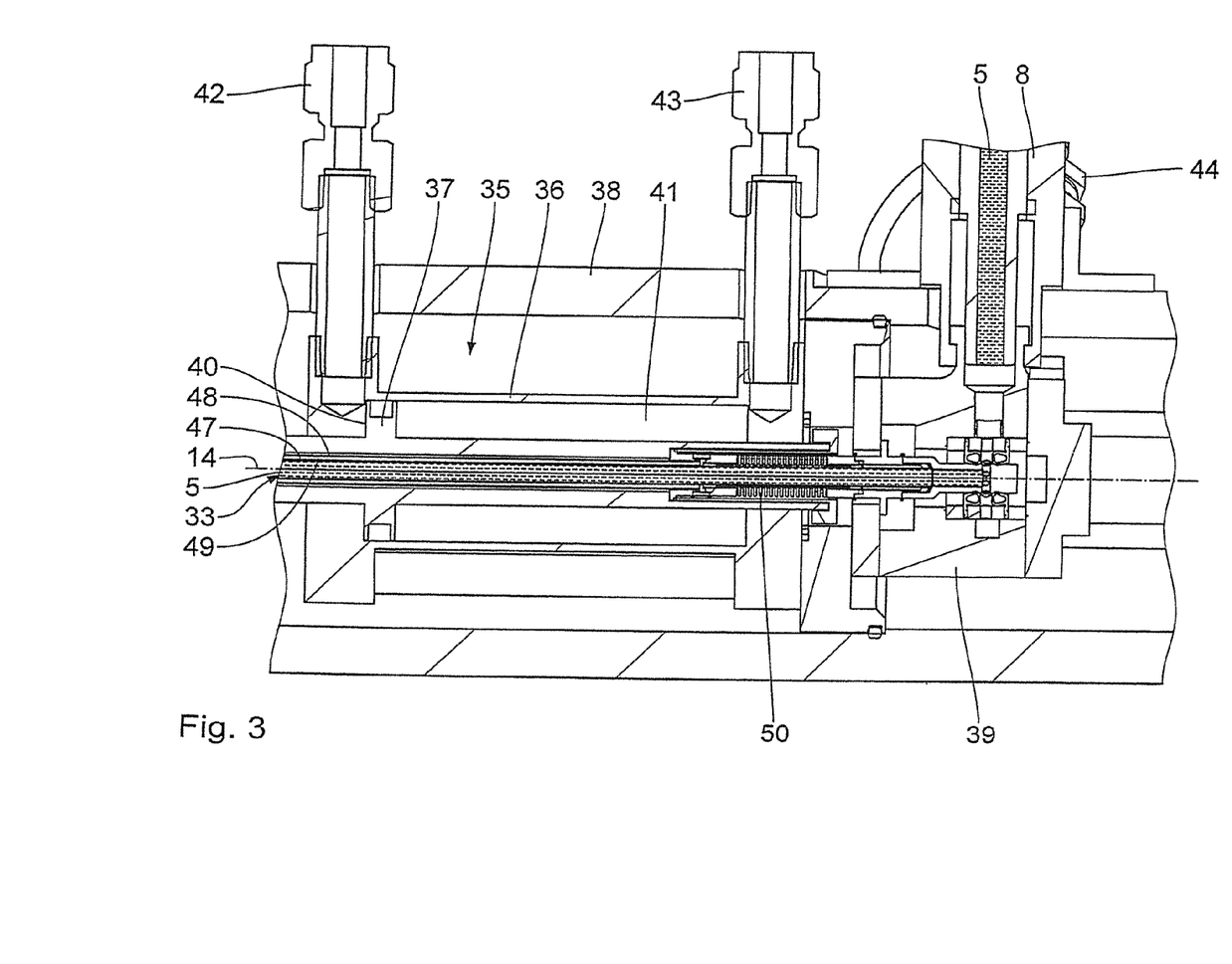
FIG. 3 shows an enlarged diagram of the machining device of FIG. 2 in the area of a shifting unit for displacement of a first supply line for the cryogenic cooling medium.

For supplying the cryogenic cooling medium 5 from the supply line 8 to the blade inserts 31, the machining device 3 has a first supply line 33 and a plurality of second supply lines 34 which are designed to be thermally insulating. The first supply line 33 is arranged concentrically with the axis of rotation 14 and can be displaced in parallel with the axis of rotation 14 by means of a shifting unit 35. To do so, the shifting unit 35 is designed as a double-acting piston-cylinder unit having a cylinder 36 and a piston 37 guided therein. The first supply line 33 is also referred to as a bayonet.

The piston-cylinder unit 35 is arranged in a connecting housing 38 which is attached to the housing 11. The supply line 8 is guided in the connecting housing 38 and is connected to the first supply line 33 by means of a connecting unit 39. For displacement of the first supply line 33 it is guided through the piston 37 and is connected to it. The piston 37 divides the working space of the piston-cylinder unit 35 into two partial working spaces 40, 41, each of which is connected to a connection 42, 43 for supplying a hydraulic medium. In this way, both partial working spaces 40, 41 can be filled with the hydraulic medium and thus the piston 37 is axially displaceable in both directions. Furthermore, two induction switches 44, 45 by means of which the position of the piston-cylinder unit 35 is detectable are arranged on the connecting housing 38. The piston-cylinder unit 35 is pneumatically or hydraulically operable, for example.

The first supply line 33 is guided concentrically with the axis of rotation 14 starting from the connecting unit 39, through the piston 37, the operating rod 28, the operating sleeve 27 and the retention knob 32 up to a distributor unit 46. To avoid unwanted heating of the cryogenic cooling medium 5 in the first supply line 33, it is designed to be vacuum insulated. To this end, the supply line 33 has an internal tube 47 and an external tube 48 surrounding it, the two tubes being connected to one another at the ends and forming an insulation space 49 between them. The insulation space 49 is evacuated so that the supply line 33 has an extremely low specific thermal conductivity. A metal bellows 50 designed in a meandering form is integrated into the external tube 48 so that the external tube 48 is variable in length. The metal bellows 50 serve to equalize different changes in length of the tubes 47, 48 due to the cryogenic cooling medium 5.

Figure 4:
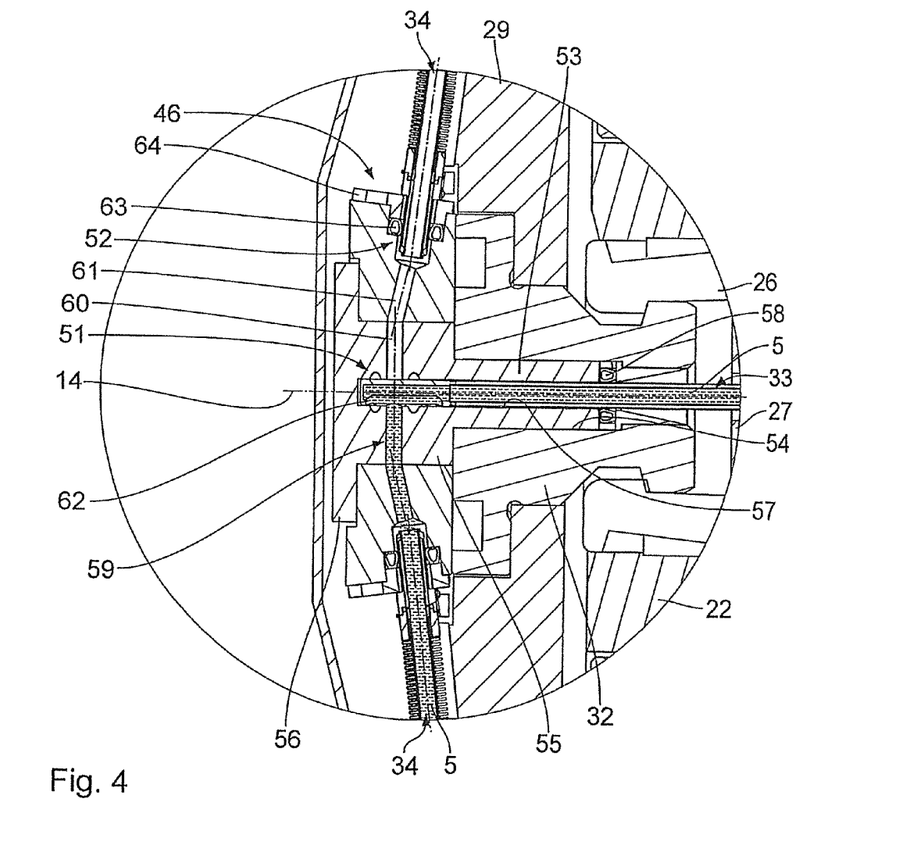
FIG. 4 shows an enlarged diagram of the machining device of FIG. 2 in the area of a distributor unit for distributing the cryogenic cooling medium from the first supply line to multiple second supply lines.

Referring to FIG. 4, the distributor unit 46 is arranged concentrically with the axis of rotation 14 on the base body 29 and includes two distributor parts 51, 52. The first distributor part 51 is designed as a three-stage cylinder extending with a first section 53 into a through-bore 54 in the retention knob 32. A second section 55 connected to the first section 53 is in contact with the retention knob 32 at the side. The second section 55 is surrounded by the second distributor part 52 which is designed in a ring shape and is also in contact with the retention knob 32 and is secured in the axial direction by means of a third section 56 which is connected to the second section 55. A first bore 57 is formed in the first distributor part 51, extending like a blind hole into the first and second sections 53, 55. The first borehole 57 is designed in the form of a funnel at the open end to facilitate the insertion of the first supply line 33. After the funnel-shaped section, a ring-shaped seal 58 which serves to seal the space between the first section 53 and the inserted supply line 33 extends into the borehole 57. The distributor unit 46 is also referred to as a rotary distributor.

The distributor unit 46 also has a plurality of second boreholes 59 which serve to introduce the second supply lines 34. The second boreholes 59 extend across and/or radially to the axis of rotation 14, a first borehole section 60 being formed in the second section 55 of the distributor part 51 and a second borehole section 61 being formed in the distributor part 52. The second boreholes 59 extend starting from the peripheral surface of the distributor part 52 up to the first bore 57 and open into it with a radial and axial offset. For supplying the cryogenic cooling medium 5 to a plurality of boreholes 59 which are arranged with an axial offset, and the connected second supply lines 34, the first supply line 33 has an outlet opening 62 peripherally on its end facing the tool 13, this outlet opening being designed in the form of an elongated hole. The outlet opening 62 is directed toward the point of engagement of the tool 13 with the crankshaft 2.

The second supply lines 34 are inserted into the second borehole sections 61. The second borehole sections 61 are designed in stages to form a stop for the respective second supply line 34 and a respective annular seal 63. The seals 63 are secured by means of the corresponding securing elements 64. The seals 63 serve to seal the interspaces between the second borehole sections 61 and the supply lines 34 inserted into them. The distributor unit 46 thus couples the first supply line 33 with at least one of the second supply lines 34 as a function of the rotational position of the tool 13. The distributor unit 46, i.e., the distributor parts 51, 52 are made of a thermally insulating plastic material. The plastic material may be PTFE, for example. The seals 58, 63 are made of a chemically resistant and thermally insulating material. PTFE, for example, may be used as the material.

Figure 5:
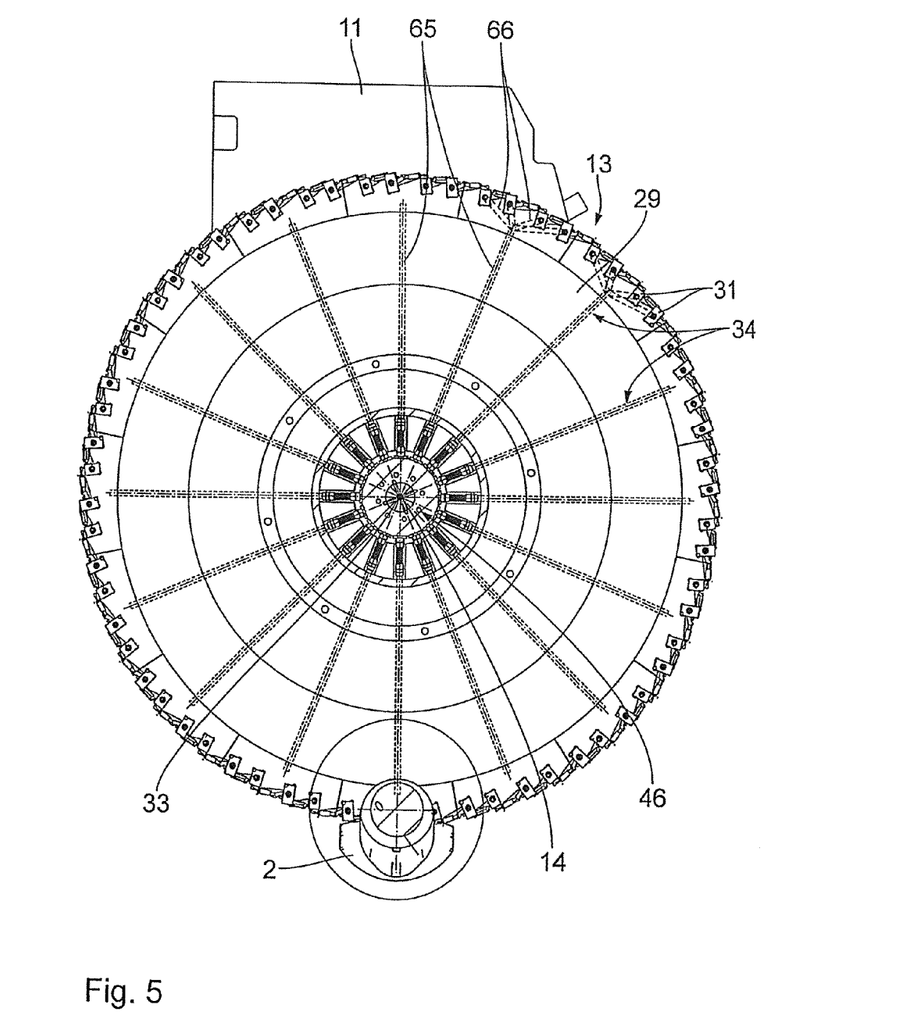
FIG. 5 shows a schematic frontal view of a tool of the machining device of FIG. 2.
Figure 6:
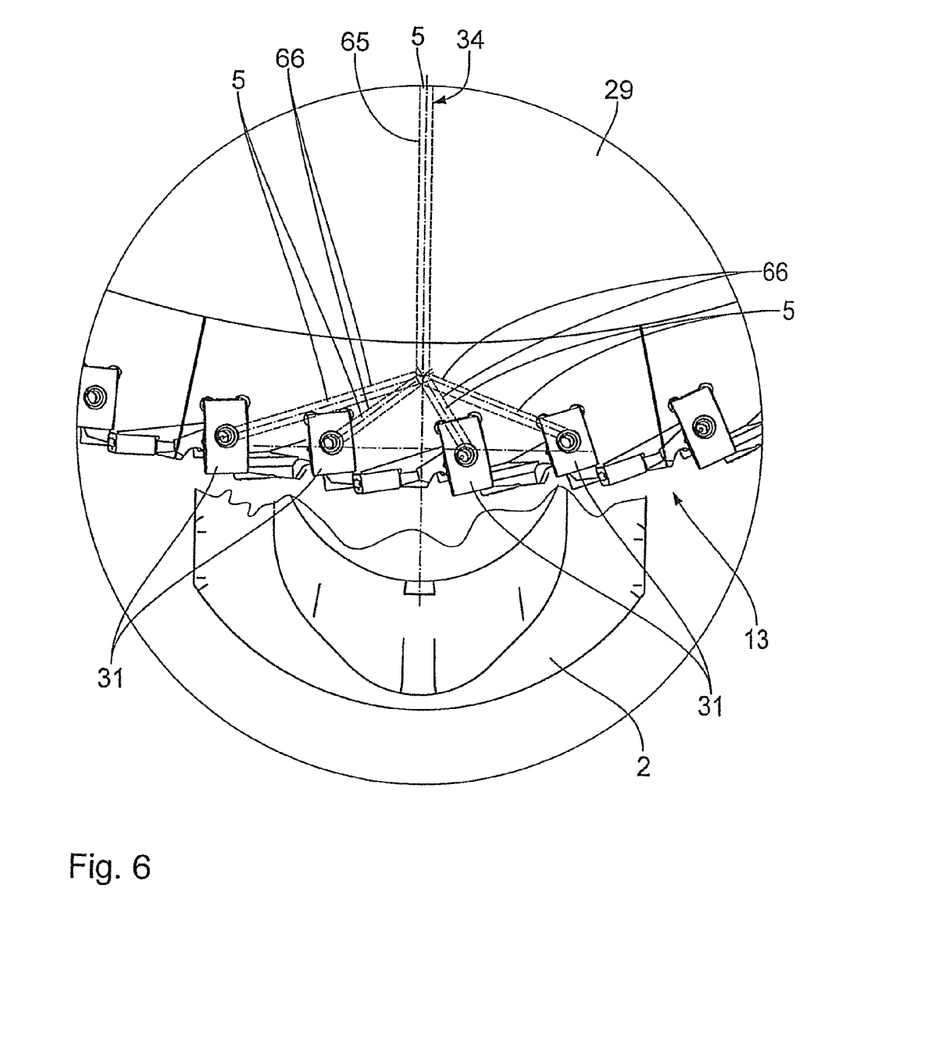
FIG. 6 shows an enlarged diagram of the tool of FIG. 5 in the area of the blade inserts.

The second supply lines 34 run across and/or radially to the axis of rotation 14 to the blade inserts 31 and thus enable the feed of cryogenic cooling medium 5 from the first supply line 33 through the distributor unit 46 to the respective blade inserts 31, which are engaged with the crankshaft 2. The second supply lines 34 each have a first line section 65 and a plurality of second line sections 66 connected thereto. The first line sections 65 run at equidistant angular intervals across and/or radially to the axis of rotation 14 from the respective second boreholes 59 up to centrally in front of four corresponding blade inserts 31. Four second line sections 66 running from the end of the first line section 65 to the blade inserts 31 belong to each first line section 65.

Figure 8:
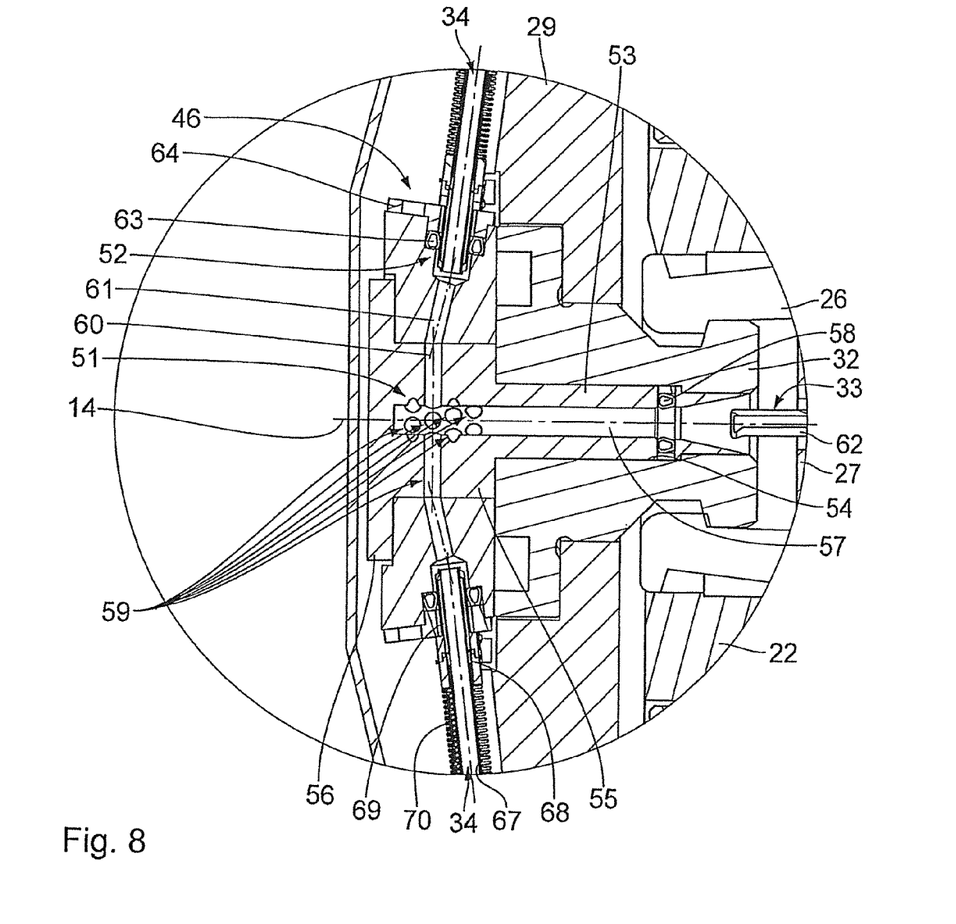
FIG. 8 shows an enlarged diagram of the distributor unit of FIG. 7.

As shown in FIGS. 5 and 6, the first line sections 65 of the second supply lines 34 are designed to be vacuum insulated. As in the case of the first supply line 33, the second supply lines 34 each have an internal tube 67 and an external tube 68 surrounding the former, the two tubes being connected to one another at the ends and bordering an insulating space 69 between them. The insulation space 69 is evacuated, so that the second supply lines 34 in the first line section 65 have an extremely low specific thermal conductivity. Meandering metal bellows 70 as shown in FIG. 8 are integrated into the respective external tube 68 to equalize the length between the internal tube 67 and the external tube 68. The length of the respective external tube 68 is variable in this way.

The second line sections 66 are not designed to be thermally insulating. Alternatively, the second line sections 66 may also be designed to be thermally insulating and in particular to be vacuum insulated. For example, the second line sections 66 may be formed by tubes consisting of a thermally insulating material inserted into corresponding boreholes. PTFE, for example, may serve as the thermally insulating material. The thermal insulation is further improved by a vacuum insulated design of the second line sections 66. Reference is made to the first line sections 65 with regard to the details of the vacuum insulated design.

The machining of a crankshaft 2 is shown in FIGS. 5-8, and is described below. The first supply line 33 is inserted into the first borehole 57 for the machining by means of the piston-cylinder unit 35, such that the outlet opening 62 comes to lie in the second section 55, i.e., at the location where the second boreholes 59 open into the first borehole 57. The first supply line 33 is inserted into the distributor unit 46 as shown in FIG. 4. Next, the tool 13 is rotationally driven about the axis of rotation 14 by the drive unit 12, and the cryogenic cooling medium 5 is supplied. The cryogenic cooling medium 5 may be liquid nitrogen, for example, which is supplied at a temperature below its evaporation temperature in the storage device 4, and is kept at the desired temperature by means of the cooling unit 6. The cut-off valve 9 is opened to supply the cryogenic cooling medium 5, so that the delivery pump 7 can deliver the cryogenic cooling medium 5 from the storage device 4 via the supply line 8 to the machining device 3.

In rotational driving of the tool 13, the piston-cylinder unit 35 and the first supply line 33 are stationary around the axis of rotation 14, whereas the rotating sleeve 20, the sleeve parts 22, 23, the spring elements 24, the piston-cylinder unit 25, the operating sleeve 27, the operating rod 28 and the collet chuck 26 rotate about the axis of rotation 14 with the tool 13 clamped in it. The cryogenic cooling medium 5 flows through the first supply line 33 to the distributor unit 46 and is distributed there, depending on the rotational position of the tool 13, to the second supply lines 34, whose respective second boreholes 59 are situated in the area of the outlet opening 62 of the first supply line 33. The cryogenic cooling medium 5 thus flows through the second supply lines 34 to the blade inserts 31, which are then engaged with the crankshaft 2, and cools the respective blades extremely effectively. The cryogenic cooling medium 5 is guided in the cassettes 30 through individual channels to the blade inserts 31 and/or the blade inserts. Since the supply lines 33, 34 are designed to be vacuum insulated and the distributor unit 46 is also made of a thermally insulating plastic material, the cryogenic cooling medium 5 does not experience any significant heating as it flows through the machining device 3. The cryogenic cooling medium 5 emerges at the blade inserts 31 with a temperature of less than −180° C. After emerging, the cryogenic cooling medium 5 evaporates, so that the machining of the crankshaft 2 takes place under dry conditions so that the crankshaft 2, as well as the entire machine tool, are not contaminated.

Figure 7:
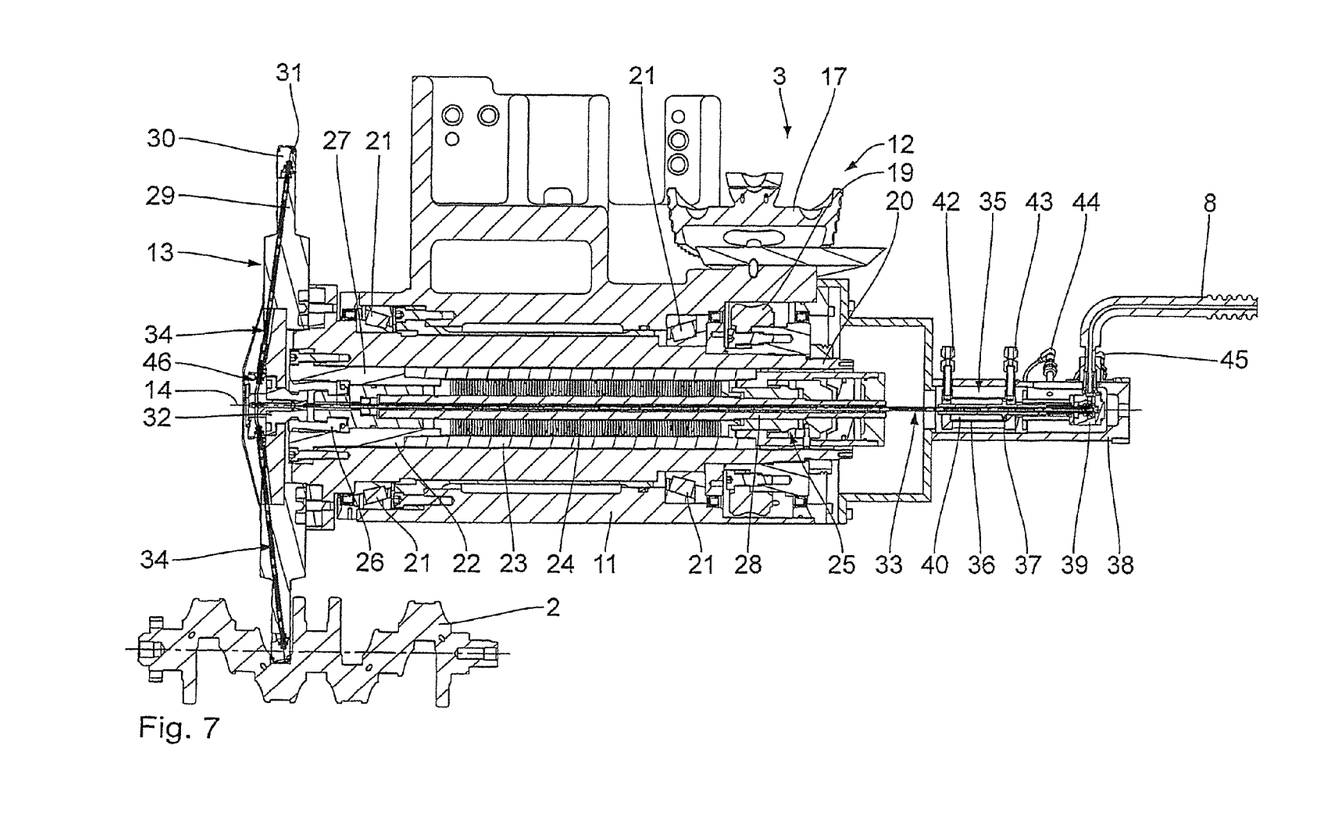
FIG. 7 shows an axial section through the machining device in a tool changing position.

For a tool change, the rotation of the tool 13 is stopped and the supply of the cryogenic cooling medium 5 is interrupted by cutting down the delivery pump 7 and turning off the cut-off valve 9. Next, the first supply line 33 together with the connecting unit 39 and the supply line 8 connected thereto is displaced by means of the piston-cylinder unit 35 so that the first supply line 33 is removed from the first borehole 57. After releasing the collet chuck 26 which is accomplished in the usual way by means of the piston-cylinder unit 25, the operating rod 28 and the operating sleeve 27, the tool 13 can be replaced by a new tool 13. After the new tool 13 has been clamped by means of the collet chuck 26 due to the force of the spring elements 24, the first supply line 33 is again displaced. It is inserted again into the first borehole 57 by means of the piston-cylinder unit 35, so that the insertion through the funnel-shaped end section of the borehole 57 is facilitated. Next, the tool 13 can be rotationally driven again and the cryogenic cooling medium 5 can be supplied again.

Figure 9:
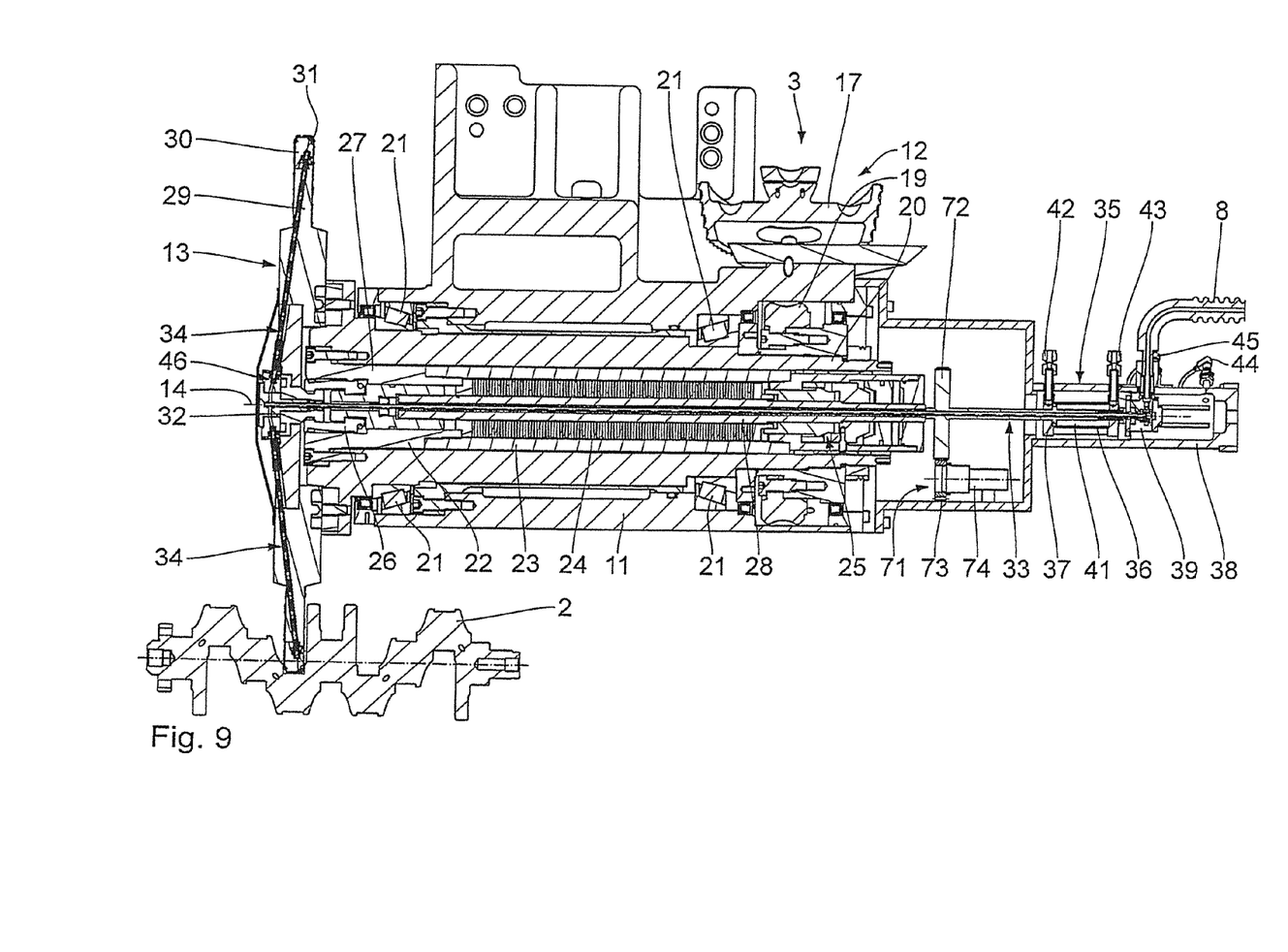
FIG. 9 shows an axial section through a machining device according to a second exemplary embodiment with a drive unit for pivoting the first supply line.

FIG. 9 shows a second exemplary embodiment of the present invention and is described below. In addition, a second drive unit 71 is arranged on the connecting housing 38, the first supply line 33 being pivotable about the axis of rotation 14 by means of this second drive unit. To do so, the first supply line 33 is connected to a first gearwheel 72, which is rotationally drivable via a second gearwheel 73 by an electric drive motor 74. The drive motors 5 and 74 can be controlled by means of the control device 10, so that the rotational position of the tool 13 is coordinated, i.e., synchronized with the pivot position of the first supply line 33. FIG. 9 shows the connecting housing 38 and the piston-cylinder unit 35 arranged therein, so that it is stationary about the axis of rotation 14. Alternatively, the connecting housing 38 and the piston-cylinder unit 35 may be pivoted together with the first supply line 33 about the axis of rotation 14. Due to the periodic pivoting movement of the first supply line 33, the outlet location of the cryogenic cooling medium 5 on the blade inserts 31 travels back and forth according to the engagement point which travels during the machining of the crankshaft 2. This is advantageous, for example, in machining the pin bearing of the crankshaft 2. Since the drive unit 72 is embodied as an NC axis, an extremely accurate correspondence of the position and/or of the movement of the outlet point of the cryogenic cooling medium 5 with the engagement point of the blade inserts 31 and/or the cutting inserts can be achieved because of the electronic gearbox function with the rotational motion of the tool 13 and/or the crankshaft 2. Reference is made to the first exemplary embodiment with regard to the remaining design as well as the further functioning of the machining system 1.

The cutting parameters in the machining of crankshafts 2 can be increased through the inventive machining system 1 and/or the inventive machining device 3 because the cryogenic cooling medium 5 is guided directly to the engagement point of the tool 13. An improvement in productivity and profitability in the machining of crankshafts 2 is achieved in this way.

A third exemplary embodiment of the invention is described below with reference to FIGS. 10 through 13. With the machining device 3, the angle of emergence of the cryogenic cooling medium 5 is variable as a function of the axial displacement position of the first supply line 33 in the distributor unit 46. This is advantageous in particular in lateral milling of the crankshaft walls. The cutting arc length fluctuates greatly within a crankshaft revolution in lateral milling of the crankshaft walls. The cutting arc length typically assumes values from 0 to 180 mm. The cutting arc thus changes greatly with respect to its length and its position. To avoid restrictions with respect to the cutting speed and service life problems, the blades in engagement must advantageously be cooled during the entire engagement time. To do so, the angular position of the cooled blades and the arc length covered by the cooled blades and/or the angle of emergence of the cryogenic cooling medium 5 must be controllable in accordance with the position and/or length of the cutting arc by means of the inventive machining system 1 and/or the inventive machining device 3.

To change the angle of emergence of the cryogenic cooling medium 5 the outlet opening 62 of the first supply line 33 is designed as an elongated hole, the width of which changes over the length. The outlet opening 62 has a first opening section 75 which has a respective length $L_1$ along the axis of rotation 14 and has a respective width $B_1$ across the axis of rotation 14. The first opening section 75 develops into a second opening section 76 which has a respective length $L_2$ and a respective width $B_2$. The length $L_2$ is approximately equal to the length $L_1$, whereas the width $B_2$ is greater than the width $B_1$. The first supply line 33 is definitely axially displaceable by means of the shifting unit 35 so that—depending on the axial displacement position of the first supply line 33—either the first opening section 75 or the second opening section 76 is situated in the area of the second bores 59.

Figure 10:
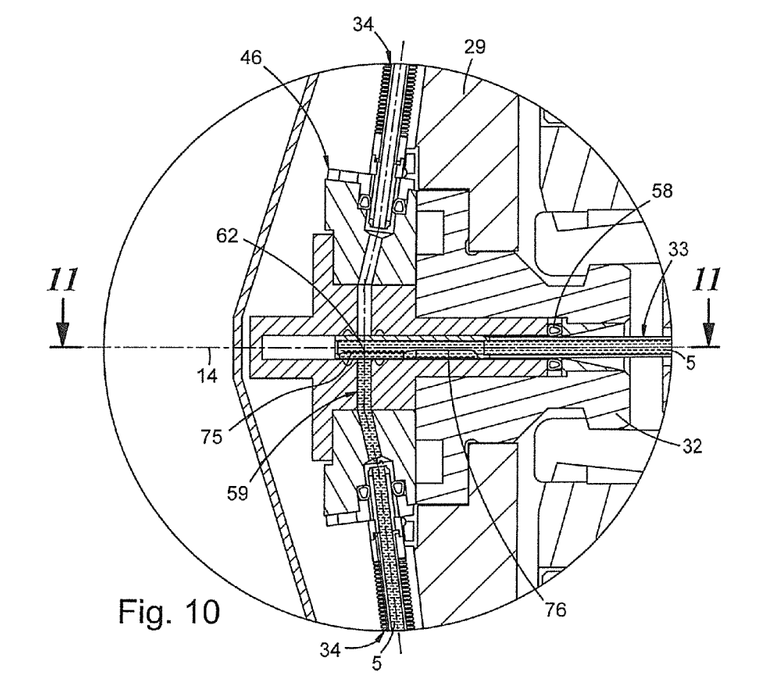
FIG. 10 shows an axial section through a machining device which is in a first operating position according to a third exemplary embodiment in the area of the distributor unit.
Figure 11:
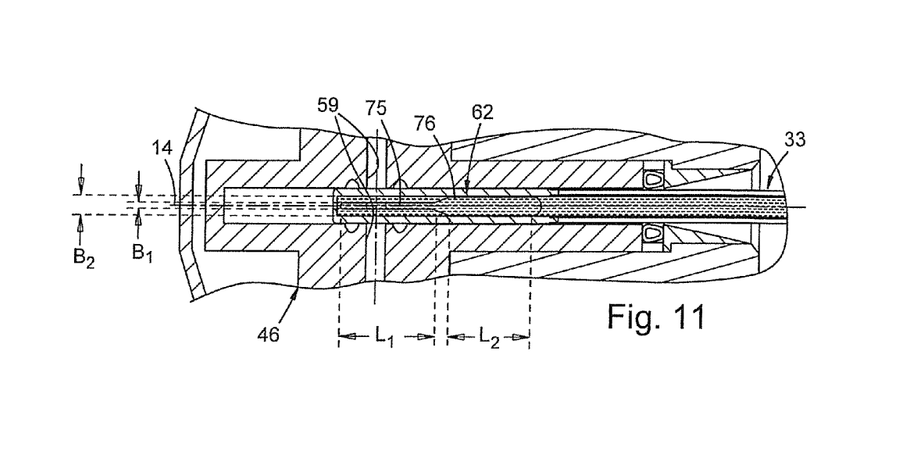
FIG. 11 shows an axial section through the machining device of FIG. 10 along the sectional plane XI-XI.

FIGS. 10 and 11 show a first operating position of the machining device 3, in which the first supply line 33 is in a first displacement position in which the first opening section 75 is situated in the area of the second boreholes 59. Due to the small width $B_1$ of the first opening section 75 there are only a few second boreholes 59 in the area of the first opening section 75 so that the cryogenic cooling medium 5 supplied is distributed only to a few second supply lines 34 accordingly. The angle of emergence of the cryogenic cooling medium 5 is low in this displacement position of the first supply line 33 but is sufficient for the machining of the cylindrical bearing surfaces.

Figure 12:
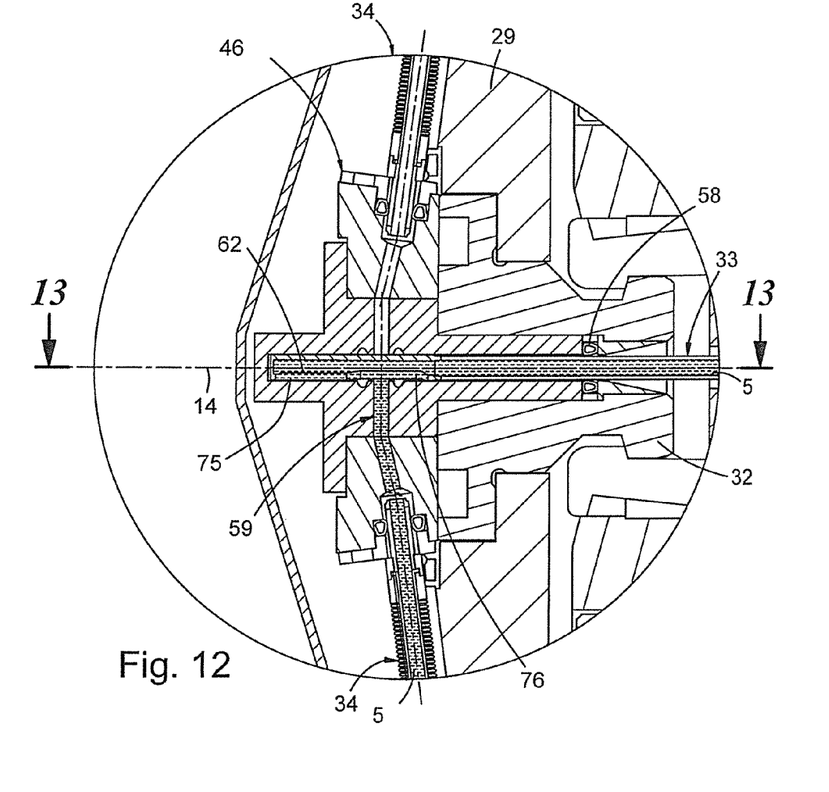
FIG. 12 shows an axial section through the machining device which is in a second operating position in the area of a distributor unit.
Figure 13:
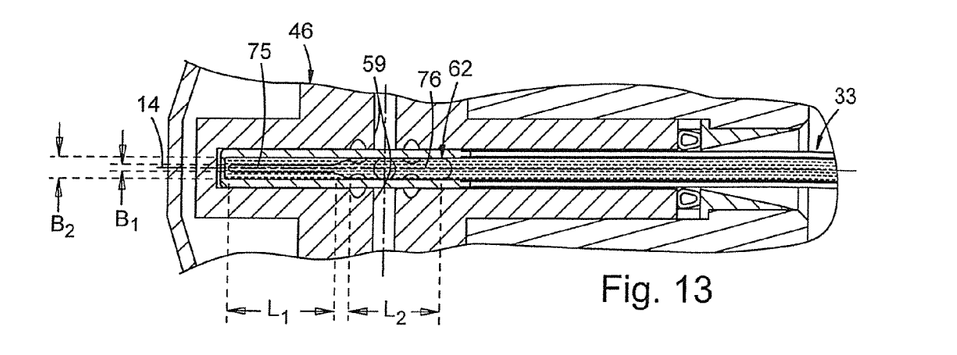
FIG. 13 shows an axial section through the machining device of FIG. 12 along the sectional plane XIII-XIII.

To increase the angle of emergence of the cryogenic cooling medium 5, and so that the tool 13 can be better cooled based on a larger cutting arc length, the first supply line 33 is displaced axially by means of the shifting unit 35 so that the second opening section 76 lies in the area of the second boreholes 59. This second operating position of the machining device 3 in which the first supply line 33 is in a second axial displacement position is shown in FIGS. 12 and 13. Because of the much greater width $B_2$ of the second opening section 76 there are now more second boreholes 59 in the area of the outlet opening 62 simultaneously, so that more second supply lines 34 are supplied with the cryogenic cooling medium 5 at the same time accordingly. The angle of emergence of the cryogenic cooling medium 5 is thereby increased. The cooled blades thus cover a larger arc of the tool 13. This is advantageous in the machining of the crankshaft walls because the cutting arc length here fluctuates greatly and the blades can be cooled along the entire cutting arc by the method described here. For defined positioning of the first supply line 33 in the distributor unit 46 the shifting unit 35 additionally has a length measurement system which determines the position of the piston 37 in the cylinder 36. The partial working spaces 40, 41 can be filled through servo valves so that the piston 37 can approach not only the end positions but also any intermediate positions in the cylinder 36. Alternatively, the shifting unit 35 may be designed as an electrical drive unit.

In crankshaft machining the angle of emergence of the cryogenic cooling medium 5 is preferably changed continuously and/or in synchronization with the rotation of the crankshaft 2. In the machining of the crankshaft walls, the second axial displacement position is triggered, whereas in the machining of the cylindrical bearing surfaces, the first displacement position is triggered. This can be accomplished by means of the control device 10.

The width of the outlet opening 62 may in principle change as desired over the length. For example, the width may change with even finer gradations or may change continuously over the length. In this way the angle of emergence can be varied even more precisely.

In addition the location of the angle of emergence can be varied by pivoting the first supply line 33 about the axis of rotation 14, as described in the second exemplary embodiment. Alternatively, the second supply lines 34 may open into the first borehole 57 through the second boreholes 59 such that the position of the angle of emergence can also be influenced through the axial displacement position of the first supply line 33.

Furthermore the cooling effect can be controlled through the flow rate of the cryogenic cooling medium 5. To do so, the flow rate is controlled by the servo valve 9.

With the machining system and/or the machining device 3 according to the invention, the size of the angle of emergence of the cryogenic cooling medium 5 can thus be adjusted independently of one another by axial displacement of the first supply line 33 and the position of the respective angle of emergence by pivoting the first supply line 33 about the axis of rotation 14, so that the distribution of the cryogenic cooling medium 5 and/or the cooling of the tool 13 can be optimally adapted to the respective requirements of crankshaft machining. With regard to further functioning, reference is made to the preceding exemplary embodiments.

The invention claimed is:

1. A machining device for machining crankshafts, the machining device comprising:
  a housing;
  a tool for machining crankshafts having crankshaft walls and cylindrical bearing surfaces, the tool comprising a disk-shaped base body with blade inserts arranged on the outer periphery of the disk-shaped base body;
  a first drive unit arranged on the housing for rotationally driving the tool about an axis of rotation;
  a first supply line for a cryogenic cooling medium arranged concentrically with the axis of rotation of the tool, wherein the first supply line is thermally insulated in at least some sections;
  a plurality of second supply lines on the tool which receive cryogenic cooling medium from the first supply line, wherein the second supply lines are radially arranged relative to the axis of rotation and lead to the blade inserts on the periphery of the base body, wherein the second supply lines are thermally insulated in at least some sections;
  a rotary distributor unit connecting the first supply line to less than all of the second supply lines and supplying the cryogenic cooling medium through the second supply lines to less than all of the blade inserts, wherein the rotary distributor unit is arranged concentrically with the axis of rotation of the tool;
  the rotary distributor unit comprising a first distributor part and a second distributor part, the first distributor part being cylindrical and having a first borehole that is axially aligned with the axis of rotation of the disk-shaped tool and the second distributor part being ring shaped and surrounding a section of the first distributor part;
  a plurality of second boreholes formed in the first distributor part and arranged radially relative to the axis of rotation of the disk-shaped tool, the second boreholes being in communication with the first borehole;
  an outer circumferential surface on the first supply line; and,
  a directional outlet opening formed on the outer circumferential surface of the first supply line, the first supply line being positioned in the first borehole, whereby the directional outlet opening may be directed toward selected ones of the second boreholes and the point of the engagement of the tool with the crankshaft, and whereby the rotary distributor unit causes the cooling medium to flow to the blade inserts that are engaged with the crankshaft and blocks the cooling medium from flowing to the blade inserts that are not engaged with the crankshaft.

2. The machining device according to claim 1, wherein the first supply line is vacuum insulated in at least some sections.

3. The machining device according to claim 1, wherein the first supply line has an internal tube and an external tube surrounding the internal tube, and wherein at least one of these tubes is variable in length.

4. The machining device according to claim 1, wherein the first supply line can be displaced linearly in the first borehole along the axis of rotation by means of a shifting unit to alter the distribution of the cryogenic cooling medium to the second supply lines and thus an angle of emergence for the cooling medium, whereby a large angle of emergence is formed for machining crankshaft walls and a smaller angle of emergence is formed for machining cylindrical bearing surfaces.

5. The machining device according to claim 1, wherein the first supply line is pivotable by means of a second drive unit about the axis of rotation and the rotary distributor unit couples the first supply line to various second supply lines as a function of the pivot position of the first supply line, whereby the location of blade inserts that are supplied with cooling medium is able to travel back and forth to correspond to a point of engagement of the blade inserts with the crankshaft.

6. The machining device according to claim 1, wherein the directional outlet opening comprises an elongated hole, and wherein the width of the elongated hole changes over the elongated hole's length.

7. The machining device according to claim 1, wherein the first borehole is funnel-shaped at one end which faces the first supply line.

8. The machining device according to claim 1 further comprising:
  a ring-shaped seal for sealing the first supply line in the first borehole.

9. The machining device according to claim 1 further comprising:
  a retention knob arranged on the base body for chucking the tool, the distributor unit extending at least partially into the retention knob.

10. The machining device according claim 1, wherein the distributor unit comprises a thermally insulating material.

11. The machining device according claim 10, wherein the distributor unit comprises a plastic material.

12. The machining device according to claim 1, wherein the second supply lines are vacuum insulated in at least some sections.

13. The machining device according to claim 1, wherein the second supply lines each have an internal tube and an external tube surrounding the internal tube, and at least one of these tubes is variable in length.

14. The machining device according to claim 1, wherein the second supply lines each have a first line section and a plurality of second line sections connected thereto, wherein the second line sections lead to a plurality of blade inserts and form an angle of emergence for the cooling medium.

15. The machining device according to claim 14 further comprising:
The directional outlet opening comprising an elongated hole having a width and a length, wherein the width of the elongated hole changes over the elongated hole's length, and wherein axial displacement of the first supply line changes the number of second line sections that receive the cooling medium and changes the angle of emergence of the cooling medium from the tool.

16. The machining device of claim 15, wherein a large angle of emergence of the cooling medium can be achieved for machining the crankshaft walls, and wherein a smaller angle of emergence can be achieved for machining the cylindrical bearing surfaces.

17. The machining device according to claim 1 further comprising:
- a thermally insulated storage device for providing the cryogenic cooling medium;
- a cooling unit for cooling the cryogenic cooling medium; and,
- a thermally insulated supply line for supplying the cryogenic cooling medium from the storage device to the machining device.

18. The machining device according to claim 17 further comprising:
- a valve for adjusting the flow rate of the cryogenic cooling medium to the machining device.

* * * * *